United States Patent [19]

Skinner

[11] 3,803,507

[45] Apr. 9, 1974

[54] INPUT CIRCUITS FOR ELECTRICAL INSTRUMENTS

[75] Inventor: Michael John Skinner, Fleet, Hampshire, England

[73] Assignee: The Solartron Electronic Group Limited, Farnborough, England

[22] Filed: Sept. 23, 1971

[21] Appl. No.: 183,003

[52] U.S. Cl. .................................. 330/185, 330/151
[51] Int. Cl. .................................. H03f 1/00
[58] Field of Search .................................. 330/151

[56] References Cited

UNITED STATES PATENTS

| | | | |
|---|---|---|---|
| 2,356,296 | 8/1944 | Zinn | 330/151 X |
| 2,554,828 | 5/1951 | Jacobs | 330/151 X |
| 2,698,898 | 1/1955 | Cooper | 330/151 X |
| 2,845,599 | 7/1958 | Toro et al. | 330/151 X |
| 3,517,223 | 6/1970 | Gaunt, Jr. | 330/151 X |
| 3,437,947 | 4/1969 | Beekman | 330/151 X |
| 3,218,566 | 11/1965 | Hayes, Jr. | 330/151 X |

*Primary Examiner*—Nathan Kaufman
*Attorney, Agent, or Firm*—William R. Sherman, Roylance, Abrams, Berdo & Kaul

[57] ABSTRACT

An input circuit for an electrical instrument comprises an active probe which includes a current amplifier matched to drive a cable. The cable is connected via a further amplifier to the input of the electrical instrument. A bypass resistor is connected in parallel with both amplifiers and the cable, and the overall gain of both amplifiers and the cable is arranged to be substantially unity.

5 Claims, 1 Drawing Figure

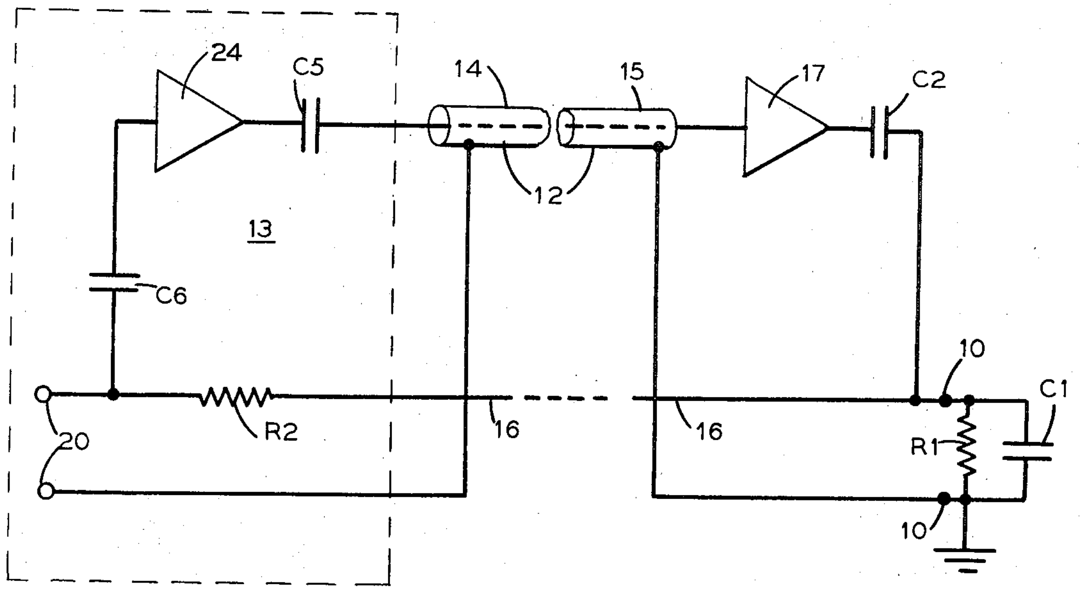
INVENTOR.
BY Michael John Skinner

INPUT CIRCUITS FOR ELECTRICAL INSTRUMENTS

This invention relates to input circuits for electrical instruments. Instruments for measurement of electrical signals over a range of frequencies extending above 1MHz are frequently required to be connected to signal sources of significant impedance (greater than 50Ω, say). If the instrument in question has more than a few picofarads of input capacitance the signal is greatly attenuated by the effect of the capacitance loading the source. Most instruments of this type (e.g. oscilloscopes) need to have input components and attenuators which result in accumulations of input capacitance of the order of 20pF to 40pF.

Furthermore, when the source is more than a few inches distance from the instrument, it is necessary to effect the connection by means of a cable or transmission line. Even when the cable and source have a characteristic impedance as low as 50Ω an input capacitance of 20pF represents a serious mismatch at frequencies above 100 MHz and errors will occur.

For these reasons it has been customary either to design such instruments in such a way as to provide inputs for low impedance lines only, which is a serious limitation to their use, or to provide 'buffer amplifiers', which normally have unity gain and very low input capacitance, to drive the instrument input proper. When the instrument response must extend down to DC the drift performance of such amplifiers must match or excel that of the basic instrument. Also their dynamic range must match that of the instrument input — a frequently impossible requirement.

When in addition it is required that the instrument must accept inputs from high impedance sources, it is necessary to provide 'active probes' — small amplifier packages mounted at the end of a cable, designed with a gain of unity and with small input capacitance. For instruments whose response must extend down to DC these are customarily DC amplifiers and their drift performance must match or exceed that of the basic instrument — a difficult problem. Also, in order that there shall be no reflection or bandwidth problems associated with the cable connecting their output to the main instrument input, it is necessary to use a low impedance (typically 50Ω) cable to connect to the main instrument; frequently imposing an intolerable requirement on the power output of the probe amplifier.

Thus it is necessary to design the main instrument for low impedance input only or to provide a buffer amplifier associated either with the active probe or with the instrument. Again it is normally impossible to provide an active probe whose dynamic range matches that of the main instrument.

Furthermore, the space available for the probe amplifier is usually very small, which imposes another severe limitation on the design of this amplifier.

It is an object of this invention to provide an input circuit for an electrical instrument, which input circuit substantially overcomes these difficulties.

According to the present invention, an input circuit for an electrical instrument having a high input resistance in parallel with input capacitance comprises an input terminal, an active probe connected to the input terminal, an output terminal for connection to the electrical instrument, and a cable interconnecting the active probe and the output terminal, characterised in that the input terminal is connected to the output terminal by the series combination of a first A.C. amplifier which is mounted in the active probe, a conductor of the cable, a second A.C. amplifier and an output capacitor for the second A.C. amplifier, the series combination being shunted by a resistor smaller than the input resistance of the electrical instrument and having an overall gain of substantially unity at frequencies where the input capacitance of the electrical instrument becomes significant in relation to the high input resistance thereof.

The first A.C. amplifier may also be provided with an output capacitor.

A further capacitor can be connected in the input of the first AC amplifier to prevent the AC amplifiers handling D.C. offsets and keep any input current out of the amplifier input circuit.

The A.C. amplifiers have no effect on the D.C. performance of the circuit but as high frequencies, when the input capacitance of the instrument would present a low input impedance in a conventional circuit, the impedance seen at the input terminals is the input resistance of the instrument in parallel with the input capacitance of the first A.C. amplifier, which may be made very low. The overall gain of the circuit is very little less than unity.

Additionally, the first A.C. amplifier, for which only limited space is available, may be a relatively simple current amplifier matched to drive the cable, while the second A.C. amplifier, for which there is usually more space available, may be designed more critically to achieve the said overall gain of unity.

The invention will now be described, by way of non-limitative example only, with reference to the accompanying drawing; which is a part-schematic circuit diagram of an input circuit in accordance with the present invention for an electrical instrument.

In the drawing, the normal input terminals of an electrical instrument are shown at 10, and are effectively connected together within the instrument by an input resistance R1 of about 1MΩ in parallel with an input capacitance C1 of about 20pF. The instrument may be, for example, an oscilloscope, a phase/amplitude comparator or a voltmeter operable from D.C. to high frequencies.

An active probe 13 having "high" and "low" input terminals 20 is connected to the input terminals 10 via a coaxial cable 12. The cable 12 has an outer screen conductor 14 which is connected between the "low" input terminal 20 and the "low" input terminal 10, and an inner conductor 15 one end of which is connected to the "high" input terminal 10 via an amplifier 17 having an output capacitor C2.

The "high" input terminal 20 of the probe 13 is connected to the other end of the inner conductor 15 via a capacitor C6 in series with an amplifier 24. The amplifier 24 may optionally have an output capacitor C5, and is designed as a relatively simple current amplifier matched to drive the cable 12.

The "high" input terminal 20 is also connected via a 10K resistor R2 mounted in the probe 13 and a lead 16, to the "high" input terminal 10 of the instrument. The lead 16 is normally run inside the outer insulation of the cable 12, but outside the outer screen conductor 14.

It will be appreciated that the resistor R2 is in parallel with the series combination of the capacitor C6, the amplifier 24, the capacitor C5 if present, the cable 12, the amplifier 17 and the capacitor C2. This series combination can be regarded as a single amplifier, whose overall gain is arranged to be substantially unity from a change-over frequency up to, say 100MHz. The input capacitance of the series combination, i.e., the input capacitance of the amplifier 24, is arranged to be very low, e.g. 1pF. The input impedance seen at the input terminals 20 thus consists of 1MΩ in parallel with only 1pF.

The said changeover frequency should not be higher than that given by $2\pi f \cdot R1 \cdot C1 = 1$, i.e., 8 KHz for the values given above. The value of C2 should be such that the equation $R1 \cdot C1 = R2 \cdot C2$ holds at least approximately. With the above values this gives C2 = 2,000pF.

If the series combination has unity gain and zero output impedance we have $$1/R2 + C2s\ (V_i - V_o) = 1/R1 + C1s\ V_o$$

where $V_i$ and $V_o$ are the input and output voltages on the high terminals 20 and 10 respectively, and $s = 1/2\ \pi f$. If $R1 \cdot C1 \cdot = R2 \cdot C2$. it can easily be shown that $$V_o = R1/R1 + R2\ V_i,$$

$$I_{in} = {}_{vi}/R1 + R2 \text{ and } Z_{in} = R1 + R2$$

Thus $V_o$ is equal to $V_i$ to within 1 percent.

The capacitor C6 is optional, but its inclusion serves to keep D.C. offsets out of the amplifier 24 and thus out of the series combination.

The amplifier 24 is designed as a simple current amplifier matched to drive the cable 12, and thus can be readily mounted in the probe 13, while the amplifier 17 is designed to achieve the overall gain of unity for the series combination.

What is claimed is:

1. In an input circuit for an electrical instrument of a type having a high input resistance in parallel with an input capacitance, the input circuit being of the type including an input terminal, an active probe connected to the input terminal, an output terminal for connection to the electrical instrument, and a cable interconnecting the active probe and the output terminal, the improved combination comprising:

a first AC amplifier connected to said input terminal, said first AC amplifier being included within said active probe;

a second AC amplifier;

a cable having an inner conductor and a shield conductor, said inner conductor series connecting said first and second AC amplifiers in cascade circuit relationship;

a capacitor series connected between the output of said second AC amplifier and said output terminal; and a resistor connected between said input and output terminals for conducting DC current said resistor having a resistance value less than the input resistance of said electrical instrument, the gain of the series connected circuit including said first and second amplifiers said cable and said capacitor being substantially unity at frequencies wherein the input capacitance of the electrical instrument becomes significant in relation to the high input resistance thereof.

2. An input circuit as claimed in claim 1 wherein said first AC amplifier includes a capacitor series connecting the output thereof with said cable inner conductor.

3. An input circuit as claimed in claim 1, wherein a capacitor is connected in series with the input of the first AC amplifier.

4. An input circuit as claimed in claim 1, wherein said resistor is mounted in the active probe.

5. An input circuit as claimed in claim 4, wherein said cable is a coaxial cable comprising an inner conductor connected between said first and second amplifiers, an outer screen conductor and a lead outside the screen conductor connecting said resistor in parallel with said amplifiers and cable.

* * * * *